United States Patent [19]

Quentin

[11] Patent Number: 5,662,211
[45] Date of Patent: Sep. 2, 1997

[54] CONVEYOR CHAIN WITH SELF RETAINING HINGE PIN WITH INTERNAL BARBS

[75] Inventor: Larry E. Quentin, Oak Creek, Wis.

[73] Assignee: Rexnord Corporation, Milwaukee, Wis.

[21] Appl. No.: 595,465

[22] Filed: Feb. 5, 1996

[51] Int. Cl.[6] .................................................. B65G 17/06
[52] U.S. Cl. ............................................................... 198/853
[58] Field of Search ..................................... 198/853, 851

[56] References Cited

U.S. PATENT DOCUMENTS

| | | | |
|---|---|---|---|
| 3,726,569 | 4/1973 | Maglio et al. | 198/853 X |
| 4,709,807 | 12/1987 | Poerink | 198/853 |
| 4,858,753 | 8/1989 | Hodlewsky | 198/853 |
| 4,972,942 | 11/1990 | Faulkner | 198/853 |
| 4,993,544 | 2/1991 | Bailey et al. | 198/834 |
| 5,020,656 | 6/1991 | Faulkner | 198/494 |
| 5,020,659 | 6/1991 | Hodlewsky | 198/853 |
| 5,125,504 | 6/1992 | Corlett et al. | 198/853 X |
| 5,253,749 | 10/1993 | Ensch | 198/853 X |
| 5,335,768 | 8/1994 | Schladweiler | 198/853 |
| 5,573,106 | 11/1996 | Stebnicki | 198/853 |

FOREIGN PATENT DOCUMENTS

| | | |
|---|---|---|
| 3241632 C2 | 5/1984 | Germany . |
| 3913077 A1 | 11/1989 | Germany . |

*Primary Examiner*—D. Glenn Dayoan
*Attorney, Agent, or Firm*—Michael, Best & Friedrich

[57] ABSTRACT

The invention relates to a conveyor having a first conveyor element including an end made of an interiorly located eye including therein an opening, and an end eye adjacently spaced from the interior eye to define therebetween a space and including therein an opening located in axial alignment with the opening in the interiorly located eye and having a given dimension, a second conveyor element including an end having an eye extending into the space between the end eye and the interiorly located eye and including therein an opening axially aligned with respect to the openings in the end eye and the interiorly located eye, and a hinge pin including a cylindrical portion extending in the opening in the interiorly located eye of the first conveyor element and in the opening in the eye of the second conveyor element, and an axially outwardly diverging conically shaped end portion extending axially from the cylindrical portion and including a diametrically and axially extending slot defining opposed barbs having outer ends located in adjacent relation to the end eye and having a dimension greater than the dimension of the opening in the end eye so as to normally be impassable through the opening in the end eye, whereby to normally prevent axially outward passage of the hinge pin through the end eye and whereby to permit passage of the hinge pin through the opening in the end eye when the barbs are displaced toward each other.

16 Claims, 2 Drawing Sheets

CONVEYOR CHAIN WITH SELF RETAINING HINGE PIN WITH INTERNAL BARBS

BACKGROUND OF THE INVENTION

The invention relates generally to belt, chain, or conveyor construction, and, in particular, to systems or arrangements for preventing unwanted axial migration of a hinge pin connecting two adjacent belt, chain, or conveyor elements.

More specifically, the axial loads on a hinge pin in a belt, chain, or conveyor are such that a hinge pin retention system is needed to prevent the hinge pin from axially migrating and forcing its way out of engagement with the axially adjacent elements of the belt, chain, or conveyor.

In the past, plugs have been employed for retaining hinge pins against axial movement in thermoplastic chains and belts. These plugs have been retained in the links of the chain or belt by cantilever style snap fits with barbed ends. In these products, the hinge pin places a tensile load on the barbed cantilevered arms.

Attention is directed to the following U.S. Patents:

U.S. Pat. Nos. 4,709,807, issued Sep. 5, 1986
4,858,753, issued Aug. 22, 1989
4,972,942, issued Nov. 27, 1990
4,993,544, issued Feb. 19, 1991
5,020,656, issued Jun. 4, 1991
5,335,768, issued Mar. 12, 1993

Attention is also directed to the following German Patents:

DE 3241632 C2
DE 3913077 A1

SUMMARY OF THE INVENTION

The invention provides a conveyor comprising a first conveyor element including an end comprising an interiorly located eye including therein an opening, and an end eye adjacently spaced from said interior eye to define therebetween a space and including therein an opening located in axial alignment with said opening in said interiorly located eye and having a given diameter, a second conveyor element including an end comprising an eye extending into said space between said end eye and said interiorly located eye and including therein an opening axially aligned with respect to said openings in said end eye and said interiorly located eye, and a hinge pin including a cylindrical portion extending in said opening in said interiorly located eye of said first conveyor element and in said opening in said eye of said second conveyor element, and an end portion including a barb which resiliently extends radially outwardly to normally prevent axially outward passage of said hinge pin through said opening in said end eye and which is resiliently deformable to a radially inward location to permit passage of said hinge pin through said opening in said end eye.

The invention also provides a conveyor comprising a first conveyor element including an end comprising an interiorly located eye including therein an opening, and an end eye adjacently spaced from the interior eye to define therebetween a space and including therein an opening located in axial alignment with the opening in the interiorly located eye and having a given dimension, a second conveyor element including an end comprising an eye extending into the space between the end eye and the interiorly located eye and including therein an opening axially aligned with respect to the openings in the end eye and the interiorly located eye, and a hinge pin including a cylindrical portion extending in the opening in the interiorly located eye of the first conveyor element and in the opening in the eye of the second conveyor element, and an axially outwardly diverging end portion extending axially from the cylindrical portion and including an axially extending slot defining opposed barbs having outer ends located in adjacent relation to the end eye and having a dimension greater than the dimension of the opening in the end eye so as to normally be impassable through the opening in the end eye, whereby to normally prevent axially outward passage of the hinge pin through the end eye and whereby to permit passage of the hinge pin through the opening in the end eye when the barbs are displaced toward each other.

The invention also provides a conveyor comprising a first conveyor element including an end comprising a first series of eyes spaced from each other, defining therebetween a series of spaces, and including a sub-series of centrally located eyes respectively including therein openings aligned with respect to each other and having a given dimension, and an end eye adjacent one end of the sub-series of centrally located eyes and including therein an opening located in axial alignment with the openings of the sub-series of centrally located eyes and having a diameter generally equal to the diameter of the openings in the sub-series of centrally located eyes, a second conveyor element including an end comprising a series of eyes spaced from each other, extending into the spaces between the eyes of the first conveyor element, defining therebetween a series of spaces receiving the eyes of the first conveyor element, and respectively including therein openings axially aligned with respect to each other and with respect to the openings of the sub-series of the centrally located eyes of the first conveyor element, and having a dimension generally equal to the dimension of the openings in the sub-series of centrally located eyes, and a hinge pin including a cylindrical portion extending in the openings of the sub-series of centrally located eyes of the first conveyor element and in the openings of the eyes of the second conveyor element, and having a dimension slightly less than the dimension of the openings in the sub-series of centrally located eyes, and an axially outwardly diverging conically shaped end portion extending axially from the cylindrical portion, and including a diametrically and axially extending slot defining opposed barbs having outer ends located in adjacent relation to the end eye of the first conveyor element and having a dimension greater than the dimension of the opening in the end eye so as to be impassable through the opening in the end eye, whereby to prevent axially outward migration of the hinge pin through the end eye.

The invention also provides a conveyor comprising a first conveyor element including an end comprising a first series of eyes spaced from each other, defining therebetween a series of spaces, and including a sub-series of centrally located eyes respectively including therein openings aligned with respect to each other and having a given diameter, and a first end eye located adjacent one end of the sub-series of centrally located eyes and including therein a central slot defining an inner end eye portion having therein an opening located in axial alignment with the openings in the sub-series of centrally located eyes and having a diameter substantially equal to the given diameter, and an outer eye portion located in axial alignment with the openings in the sub-series of centrally located eyes and having a diameter substantially equal to the given diameter, and a second end eye located adjacent the other end of the sub-series of centrally located eyes and including therein a central slot defining an inner end eye portion having therein an opening located in axial alignment with the openings in the sub-series of centrally located eyes and having a diameter substantially equal to the given diameter, and an outer eye portion located in axial alignment with the openings in the sub-series of centrally located eyes and having a diameter substantially equal to the given diameter, a second conveyor element including an end comprising a series of eyes spaced from each other, extending into the spaces between the eyes of the first conveyor element without occupying the slots of the first and second end eyes, defining therebetween a series of spaces receiving the eyes of the first conveyor element, and respectively including therein openings axially aligned with respect to each other and with respect to the openings of the sub-series of the centrally located eyes of the first conveyor element, and having a diameter generally equal to the diameter of the openings in the sub-series of centrally located eyes, and a hinge pin fabricated of resilient material and including a cylindrical portion extending in the openings of the sub-series of centrally located eyes of the first conveyor element and in the openings of the eyes of the second conveyor element, and having a diameter approximately equal to or slightly less than the diameter of the openings in the sub-series of centrally located eyes, and a first axially outwardly diverging conically shaped end portion extending axially from one end of the cylindrical portion, and including a first diametrically and axially extending slot defining first opposed barbs having outer ends located in adjacent relation to the outer portion of the first end eye and having a diameter greater than the diameter of the opening in the outer portion of the first end eye so as to be impassable through the opening in the outer portion of the first end eye, whereby to prevent axially outward passage of the hinge pin through the opening in the outer portion of the first end eye, and a second axially outwardly diverging conically shaped end portion extending axially from the other end of the cylindrical portion, and including a diametrically and axially extending slot defining opposed barbs having an outer end located in adjacent relation to the second end eye and having a diameter greater than the diameter of the opening in the outer portion of the second end eye so as to be impassable through the opening in the outer end portion of the second end eye, whereby to prevent axially outward passage of the hinge pin through the opening of the outer portion of the second end eye, whereby the resilient material of the hinge pin permits movement of the barbs toward each other to facilitate passage of the hinge pin end portions through the openings in the outer portions of the first and second end eyes, whereby to permit assembly of the hinge pin in the openings of the conveyor elements and to permit removal of the hinge pin from assembly with the conveyor elements.

Other features and advantages of the invention will become apparent to those skilled in the art upon review of the following detailed description, claims and drawings.

Figure 1:
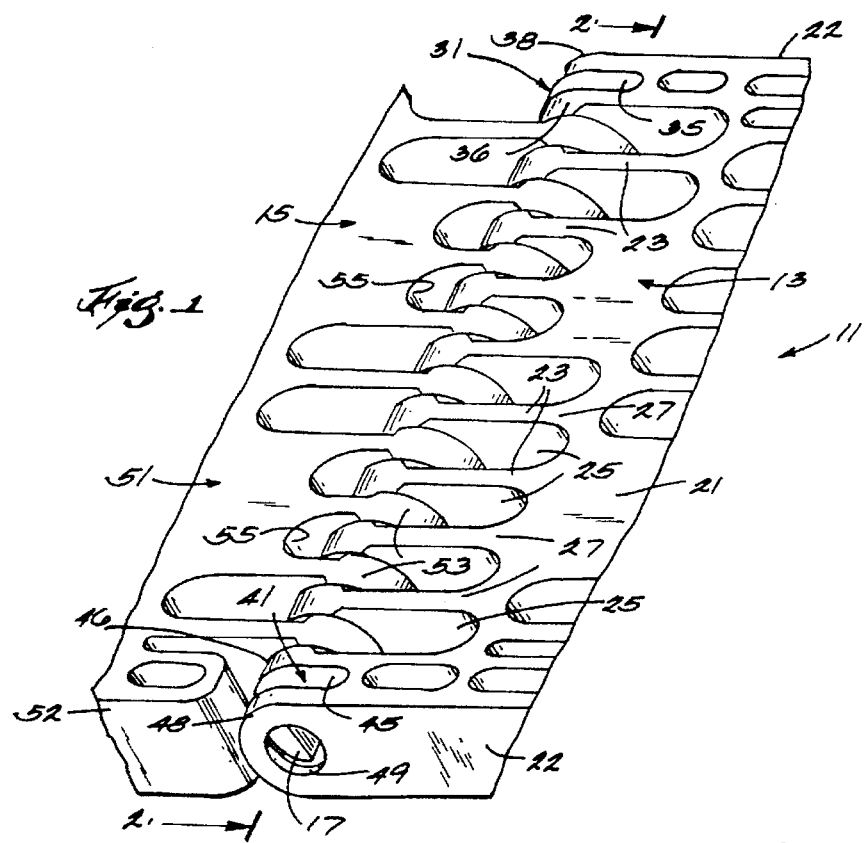
FIG. 1 is a perspective view of one embodiment of a conveyor, track, or belt which includes various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 5:
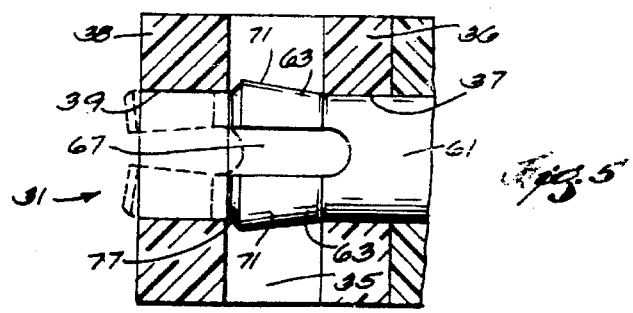
FIG. 5 is a fragmentary, enlarged sectional view of a portion of the constructions shown in FIG. 2.
Figure 2:
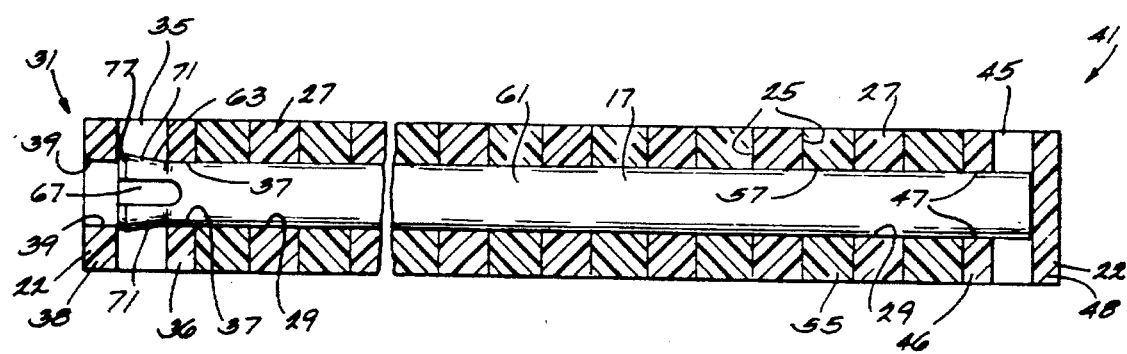
FIG. 2 is a sectional view taken along line 2—2 of FIG. 1.

Illustrated in FIGS. 1, 2, and 5 is a first embodiment of a conveyor, belt, or track 11 comprising first and second conveyor elements 13 and 15 and a hinge pin 17. The invention is applicable to any type of track assembly or conveyor, and, except as noted hereinafter, the conveyor elements can take any conventional form and can be fabricated of any suitable material.

The first conveyor element 13 can be fabricated of any suitable substantially rigid material, such as thermoplastic material, and includes laterally spaced and generally rectilinearly extending sides 22, together with an end 21 located between the sides 22 and comprising a series of eyes 23 which are spaced from each other to define therebetween a series of spaces 25. The series of eyes 23 includes a sub-series of centrally located eyes 27 respectively including therein openings or bores 29 aligned with respect to each other and having a given diameter.

The series of eyes 23 also includes (see FIG. 2) a first end eye 31 located adjacent one end of the sub-series of centrally located eyes 27 and inwardly of the associated lateral side 22. The series of eyes 23 also includes a second end eye 41 located adjacent the other end of the sub-series of centrally located eyes 27.

Preferably, the first and second end eyes 31 and 41 respectively include therein central slots 35 and 45 defining inner end eye portions 36 and 46 having therein respective openings or bores 37 and 47 located in axial alignment with the openings 29 in the sub-series of centrally located eyes 27 and having a diameter substantially equal to the given diameter of the openings 29. The end eyes 31 and 41 also define respective outer eye portions 38 and 48, the eye portion 38 having therein a respective opening or bore 39 located in axial alignment with the openings 29 in the sub-series of centrally located eyes 27 and having a diameter substantially equal to the given diameter of the openings 29. The eye portion 48 is a blind eye and does not include a bore. The slots 35 and 45 permit visual determination of the presence or absence of the hinge pin in the end eyes 31 and 41 and slot 35 also allows access for a pair of conventional pliers, such as needle nose pliers, to squeeze the expanded end portions 63, thus allowing removal of the hinge pin 17. The slot 67 also permits the end of the hinge pin to expand in the event of an axial load on the hinge pin 17 against the inside surface of the end eye 31.

The second conveyor element 15 can be fabricated of any suitable substantially rigid material, such as thermoplastic material or steel, and includes laterally spaced and generally rectilinearly extending sides 52, together with an end 51 extending between the sides 52 and comprising a series of eyes 53 which are spaced from each other and extend into the spaces 25 between the eyes 23 of the first conveyor element 13. The spacing of the eyes 53 also defines a series of spaces 55 receiving the centrally located eyes 27 of the first conveyor element 13. The series of eyes 53 also respectively includes therein openings or bores 57 axially aligned with respect to each other and with respect to the openings 29 of the sub-series of the centrally located eyes 27 of the first conveyor element 13, which openings or bores 57 have diameters generally equal to the diameters of the openings 29 in the sub-series of centrally located eyes 27.

The hinge pin 17 can be fabricated of any suitably resilient material, such as thermoplastic or steel, is cylindrical in shape, and includes a cylindrical portion 61 extending in the openings 29 of the sub-series of centrally located eyes 27 of the first conveyor element 13 and in the openings 57 of the eyes 53 of the second conveyor element 15, and having a diameter slightly less than the diameter of the openings 29 in the sub-series of centrally located eyes 27.

In addition the hinge pin 17 also includes axially outwardly diverging conically shaped end portion 63. The axially outwardly diverging conically shaped end portion 63 respectively includes a diametrically and axially extending slot 67 which extends slightly into the central portion 61 and which defines opposed barbs 71 and 73 having respective outer ends 77 and 79 located in adjacent relation to the associated end eye 31 of the first conveyor element 13. The opposed barbs 71 and 73 in the end portion 63 have, when considered together, a maximum dimension or diameter greater than the diameter of the openings 39 in the outer eye portions 38 of the associated end eye 31 so as to be impassable through the opening 39 in the outer eye portion 38 of the associated end eye 31, whereby to prevent axially outward migration of the hinge pin 17 through the outer eye portion 38 of the associated end eye 31.

During assembly of the hinge pin 17 with the first and second conveyor elements 13 and 15, the hinge pin 17 is pushed through the appropriate openings in the eyes until the hinge pin 17 is properly located with the ends of the barbs 71 in slightly axially inwardly spaced relation from the outer eye portion 38 of the end eye 31 of the first conveyor element 13. When so properly located, the barbs 71 resiliently move to their normally spaced positions such that reverse axial travel of the hinge pin 17 through the outer end portions 38 of the end eye 31 is prevented.

Figure 3:
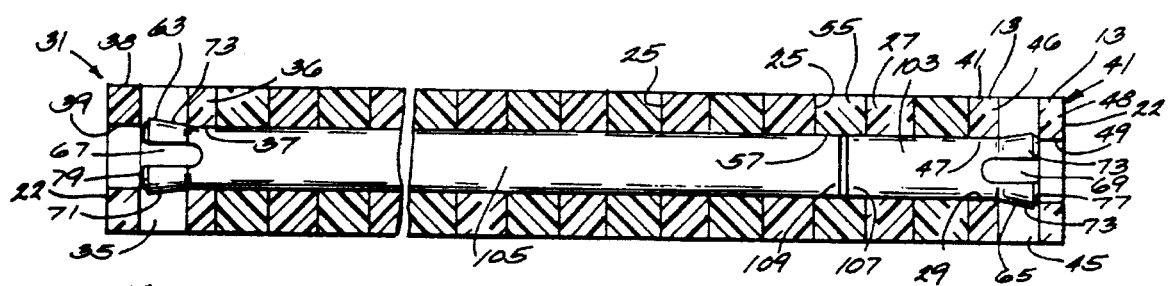
FIG. 3 is a sectional view which is similar to FIG. 2 and which illustrates another embodiment of a conveyor, track, or belt including various of the features of the invention.

Illustrated in FIG. 3 is a second embodiment of a conveyor, belt, or track 101 comprising first and second conveyor elements 13 and 15 and a hinge pin 17. The construction shown in FIG. 3 is identical to the construction shown in FIG. 2 except that the hinge pin 17 is of two-piece construction, and the end eye 48 includes a central bore 49. More specifically, in the construction shown in FIG. 3, the central portion 61 is divided into first and second sub-portions 103 and 105 which respectively extend from the end portions 63 and 65 in one piece. The portion 105 includes an end having barbs 73 separated by a groove 69. The axial length of the sub portions 103 and 105 can be allocated as desired. Preferably, the axially inner end surfaces 107 and 109 of the sub-portions 103 and 105 extend perpendicularly to the hinge pin axis and have sharp edges.

Figure 4:
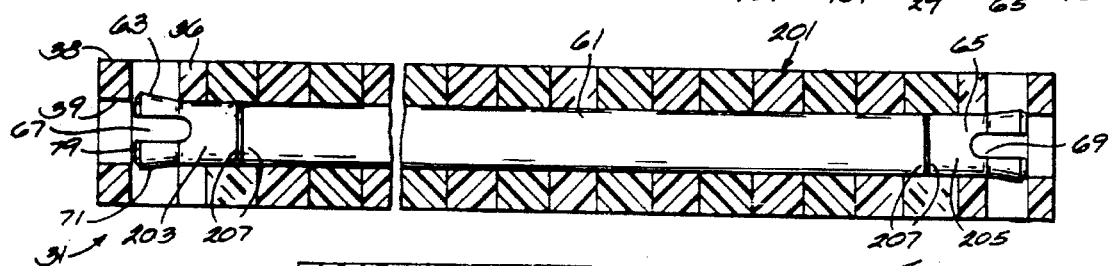
FIG. 4 is a sectional view which is similar to FIG. 2 and which illustrates still another embodiment of a conveyor, track, or belt including various of the features of the invention.

Illustrated in FIG. 4 is a third embodiment of a conveyor, belt, or track 201 comprising first and second conveyor elements 13 and 15 and a hinge pin 17. The construction shown in FIG. 4 is identical to the construction shown in FIG. 2 except that the hinge pin 17 is of three-piece construction. More specifically, in the construction shown in FIG. 4, the end portions 63 and 65 are separate pieces, and the central portion 61 is also a separate piece and can be fabricated from steel. The central portion 61 can have an axial length less than the axial length of the central portion 61 included in the construction shown in FIG. 2. The end portions 63 and 65 can include axially inner cylindrical extensions 203 and 205 having a combined axial length corresponding to the reduction in length of the central portion 61. Preferably, the axially inner ends of the end portion extensions 203 and 205 and the opposite ends of the central portion 61 are provided with chamfers 207.

As a consequence of the disclosed construction, the barbs 71 and 73 prevent axially outward (and axially inward) migration of the hinge pin 17. More specifically, when the hinge pin 17 is inserted into the links, the opposed barbs 71 and 73 collapse, and when the hinge pin 17 is fully inserted, the barbs 71 and 73 snap out into the spaces or slots 35 and 45 provided in the associated end eyes 31 and 41, thereby providing interference between the hinge pin 17 and the opening, bore, or hole 39 or 49 in the associated outer eye portion 38 and 48 of the associated end eye 31 and 41. When loaded axially, the barbs 71 and 73 push further apart in the slots or spaces 35 and 45 in the associated end eye, thereby creating greater interference and, thus, better hinge pin retention.

It is also noted that the barbs 71 and 73 are located internally of the sides of the chain or conveyor or belt. This internal interference provides greater resistivity to axial loading and allows for inspection of the function and cleanliness of the barbs 71 and 73 due to the open condition of the slot or spaces 35 and 45, i.e., inside of the lateral side edges of the chain. Furthermore, the barbs are easily cleaned because of the open design, i.e., the presence of the spaces or slots 35 and 45.

In addition, in the disclosed construction, hinge pin retention does not rely on mating surfaces which are especially susceptible to contamination.

Various of the features are set forth in the following claims.

I claim:

1. A conveyor comprising a first conveyor element including an end comprising an interiorly located eye including therein an opening, and an end eye adjacently spaced from said interior eye to define therebetween a space and including therein an opening located in axial alignment with said opening in said interiorly located eye and having a given dimension, a second conveyor element including an end comprising an eye extending into said space between said end eye and said interiorly located eye and including therein an opening axially aligned with respect to said openings in said end eye and said interiorly located eye, and a hinge pin including a cylindrical portion extending in said opening in said interiorly located eye of said first conveyor element and in said opening in said eye of said second conveyor element, and an axially outwardly diverging conically shaped end portion extending axially from said cylindrical portion and including an axially extending slot defining opposed barbs having outer ends located in adjacent relation to said end eye and having a dimension greater than said dimension of said opening in said end eye so as to normally be impassable through said opening in said end eye, whereby to normally prevent axially outward passage of said hinge pin through said end eye and whereby to permit passage of said hinge pin through said opening in said end eye when said barbs are displaced toward each other.

2. A conveyor in accordance with claim 1 wherein said first conveyor element also includes a second end eye including therein an opening located in axial alignment with said opening in said interiorly located eye and having a dimension, and wherein said hinge pin also includes a second axially outwardly diverging end portion extending axially from said cylindrical portion, and including a diametrically and axially extending slot defining opposed barbs having outer ends located in adjacent relation to said second end eye and having a dimension greater than said dimension of said opening in said second end eye so as to normally be impassable through said opening in said second end eye, whereby to normally prevent axially outward passage of said hinge pin through said second end eye and to permit passage of said hinge pin through said opening in said second end eye when said barbs of said second hinge pin end portion are displaced toward each other.

3. A conveyor in accordance with claim 2 wherein said hinge pin is fabricated in one-piece.

4. A conveyor in accordance with claim 2 wherein said hinge pin is fabricated in two axially adjacent pieces.

5. A conveyor in accordance with claim 1 wherein said hinge pin is fabricated of resilient material permitting movement of said barbs toward each other to facilitate passage of said end portion through said opening in said end eye, whereby to permit assembly of said hinge pin in said openings of said conveyor elements and to permit removal of said hinge pin from said assembly with said conveyor elements.

6. A conveyor in accordance with claim 1 wherein said end eye includes a central slot unoccupied by said second conveyor element and defining an inner end eye portion having therein an opening with an axis in alignment with said opening in said interiorly located eye, and an outer eye portion having therein said opening with said given dimension.

7. A conveyor in accordance with claim 1 wherein said openings in said interiorly located eye and in said eye of said second conveyor element have a diameter approximately equal to said given dimension, and wherein said central hinge portion has a dimension approximately equal to, or slightly less than, said given dimension.

8. A conveyor comprising a first conveyor element including an end comprising a first series of eyes spaced from each other, defining therebetween a series of spaces, and including a sub-series of centrally located eyes respectively including therein openings aligned with respect to each other and having a given dimension, and an end eye adjacent one end of said sub-series of centrally located eyes and including therein an opening located in axial alignment with said openings of said sub-series of centrally located eyes and having a diameter generally equal to said diameter of said openings in said sub-series of centrally located eyes, a second conveyor element including an end comprising a series of eyes spaced from each other, extending into the spaces between said eyes of said first conveyor element, defining therebetween a series of spaces receiving said eyes of said first conveyor element, and respectively including therein openings axially aligned with respect to each other and with respect to said openings of said sub-series of said centrally located eyes of said first conveyor element, and having a dimension generally equal to said dimension of said openings in said sub-series of centrally located eyes, and a hinge pin including a cylindrical portion extending in said openings of said sub-series of centrally located eyes of said first conveyor element and in said openings of said eyes of said second conveyor element, and having a dimension slightly less than said dimension of said openings in said sub-series of centrally located eyes, and an axially outwardly diverging conically shaped end portion extending axially from said cylindrical portion, and including a diametrically and axially extending slot defining opposed barbs having outer ends located in adjacent relation to said end eye of said first conveyor element and having a dimension greater than said dimension of said opening in said end eye so as to be impassable through said opening in said end eye, whereby to prevent axially outward migration of said hinge pin through said end eye.

9. A conveyor in accordance with claim 8 wherein said first conveyor element also includes a second end eye including therein an opening located in axial alignment with said openings of said sub-series of centrally located eyes and having a dimension generally equal to said dimension of said openings in said sub-series of centrally located eyes, and wherein said hinge pin also includes a second axially outwardly diverging conically shaped end portion extending axially from said cylindrical portion, and including a diametrically and axially extending slot defining opposed barbs having outer ends located in adjacent relation to said second end eye and having a dimension greater than said dimension of said opening in said second end eye so as to be impassable through said opening in said second end eye, whereby to prevent axially outward migration of said hinge pin through said second end eye.

10. A conveyor in accordance with claim 9 wherein said hinge pin is fabricated in one-piece.

11. A conveyor in accordance with claim 9 wherein said hinge pin is fabricated in two axially adjacent pieces.

12. A conveyor in accordance with claim 8 wherein said hinge pin is fabricated of resilient material permitting movement of said barbs toward each other to facilitate passage of said end portion through said opening in said end eye, whereby to permit assembly of said hinge pin in said openings of said conveyor elements and to permit removal of said hinge pin from assembly with said conveyor elements.

13. A conveyor comprising a first conveyor element including an end comprising a first series of eyes spaced from each other, defining therebetween a series of spaces, and including a sub-series of centrally located eyes respectively including therein openings aligned with respect to each other and having a given diameter, and a first end eye located adjacent one end of said sub-series of centrally located eyes and including therein a central slot defining an inner end eye portion having therein an opening located in axial alignment with said openings in said sub-series of centrally located eyes and having a diameter substantially equal to said given diameter, and an outer eye portion located in axial alignment with said openings in said sub-series of centrally located eyes and having a diameter substantially equal to said given diameter, and a second end eye located adjacent the other end of said sub-series of centrally located eyes and including therein a central slot defining an inner end eye portion having therein an opening located in axial alignment with said openings in said sub-series of centrally located eyes and having a diameter substantially equal to said given diameter, and an outer eye portion located in axial alignment with said openings in said sub-series of centrally located eyes and having a diameter substantially equal to said given diameter, a second conveyor element including an end comprising a series of eyes spaced from each other, extending into the spaces between said eyes of said first conveyor element without occupying said slots of said first and second end eyes, defining therebetween a series of spaces receiving said eyes of said first conveyor element, and respectively including therein openings axially aligned with respect to each other and with respect to said openings of said sub-series of said centrally located eyes of said first conveyor element, and having a diameter generally equal to said diameter of said openings in said sub-series of centrally located eyes, and a hinge pin fabricated of resilient material and including a cylindrical portion extending in said openings of said sub-series of centrally located eyes of said first conveyor element and in said openings of said eyes of said second conveyor element, and having a diameter approximately equal to or slightly less than said diameter of said openings in said sub-series of centrally located eyes, and a first axially outwardly diverging conically shaped end portion extending axially from one end of said cylindrical portion, and including a first diametrically and axially extending slot defining first opposed barbs having outer ends located in adjacent relation to said outer portion of said first end eye and having a diameter greater than said diameter of said opening in said outer portion of said first end eye so as to be impassable through said opening in said outer portion of said first end eye, whereby to prevent axially outward passage of said hinge pin through said opening in said outer portion of said first end eye, and a second axially outwardly diverging conically shaped end portion extending axially from the other end of said cylindrical portion, and including a diametrically and axially extending slot defining opposed barbs having an outer end located in adjacent relation to said second end eye and having a diameter greater than said diameter of said opening in said outer portion of said second end eye so as to be impassable through said opening in said outer end portion of said second end eye, whereby to prevent axially outward passage of said hinge pin through said opening of said outer portion of said second end eye, whereby said resilient material of said hinge pin permits movement of said barbs toward each other to facilitate passage of said hinge pin end portions through said openings in said outer portions of said first and second end eyes, whereby to permit assembly of said hinge pin in said openings of said conveyor elements and to permit removal of said hinge pin from said assembly with said conveyor elements.

14. A conveyor in accordance with claim 13 wherein said hinge pin is fabricated in one-piece.

15. A conveyor in accordance with claim 13 wherein said hinge pin is fabricated in two axially adjacent pieces.

16. A conveyor comprising a first conveyor element including an end comprising an interiorly located eye including therein an opening, and an end eye adjacently spaced from said interior eye to define therebetween a space and including therein an opening located in axial alignment with said opening in said interiorly located eye and having a given diameter, a second conveyor element including an end comprising an eye extending into said space between said end eye and said interiorly located eye and including therein an opening axially aligned with respect to said openings in said end eye and said interiorly located eye, and a hinge pin including a cylindrical portion extending in said opening in said interiorly located eye of said first conveyor element and in said opening in said eye of said second conveyor element, and an end portion including a barb which resiliently extends radially outwardly to normally prevent axially outward passage of said hinge pin through said opening in said end eye and which is resiliently deformable to a radially inward location to permit passage of said hinge pin through said opening in said end eye.

\* \* \* \* \*